(12) United States Patent
Hong

(10) Patent No.: US 11,610,394 B2
(45) Date of Patent: Mar. 21, 2023

(54) NEURAL NETWORK MODEL TRAINING METHOD AND APPARATUS, LIVING BODY DETECTING METHOD AND APPARATUS, DEVICE AND STORAGE MEDIUM

(71) Applicant: BAIDU ONLINE NETWORK TECHNOLOGY (BEIJING) CO., LTD., Beijing (CN)

(72) Inventor: Zhibin Hong, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 93 days.

(21) Appl. No.: 16/028,830

(22) Filed: Jul. 6, 2018

(65) Prior Publication Data
US 2019/0026605 A1 Jan. 24, 2019

(30) Foreign Application Priority Data
Jul. 19, 2017 (CN) .......................... 2017105892761

(51) Int. Cl.
G06V 10/82 (2022.01)
G06V 40/40 (2022.01)
(Continued)

(52) U.S. Cl.
CPC ............ G06V 10/82 (2022.01); G06F 18/217 (2023.01); G06V 40/103 (2022.01); G06V 40/168 (2022.01); G06V 40/45 (2022.01)

(58) Field of Classification Search
CPC ........... G06K 9/00369; G06K 9/00906; G06K 9/00268; G06K 9/6262; G06F 18/213;
(Continued)

(56) References Cited

U.S. PATENT DOCUMENTS

2018/0025242 A1* 1/2018 Chandraker ....... G06K 9/00255
382/118
2019/0147218 A1* 5/2019 Johnson ............. G06K 9/00087

FOREIGN PATENT DOCUMENTS

CN 106599772 A 4/2017
CN 106650670 A 5/2017
(Continued)

OTHER PUBLICATIONS

Li et al, "An Original Face Anti-spoofing Approach using Partial Convolutional Neural Network", 2016 (Year: 2016).*
Chinese Office Action dated Mar. 27, 2020, for related Chinese Appln. No. 201701589276.1; 9 Pages.
(Continued)

*Primary Examiner* — Ruiping Li
(74) *Attorney, Agent, or Firm* — Brooks Kushman P.C.

(57) ABSTRACT

The present disclosure provides a neural network model training method and apparatus, a living body detecting method and apparatus, a device and a storage medium. It is feasible to, with respect to different scenarios, respectively obtain picture samples under the scenarios, each picture sample having a tag, the tag including a living body or a non-living body and a corresponding scenario; and according to obtained picture samples, train to obtain a neural network model whose output is a feature vector which is discriminative for different scenarios. As such, when the living body detection is performed, it is possible to determine the feature vector of the to-be-detected picture according to the neural network model, then determine a picture sample matched with the to-be-detected picture, and regard the tag of the matched picture sample as the tag of the to-be-detected picture, thereby obtaining the detection result of the to-be-detected picture.

20 Claims, 5 Drawing Sheets

(51) Int. Cl.
*G06V 40/10* (2022.01)
*G06V 40/16* (2022.01)
*G06F 18/21* (2023.01)

(58) Field of Classification Search
CPC ...... G06F 18/217; G06F 18/214; G06F 18/23; G06F 18/2413; G06F 18/24133; G06F 18/28; G06V 10/82; G06V 40/103; G06V 40/168; G06V 40/45
See application file for complete search history.

(56) References Cited

FOREIGN PATENT DOCUMENTS

| CN | 106682187 A | 5/2017 |
|---|---|---|
| CN | 106778607 A | 5/2017 |
| CN | 106845549 A | 6/2017 |
| WO | 2007058950 A2 | 5/2007 |

OTHER PUBLICATIONS

Chinese Search Report dated Mar. 20, 2020 for related Chinese Appln. No. 201701589276.1; 2 Pages.
Second Chinese Office Action dated Oct. 10, 2020, for related Chinese Appln. No. 201701589276.1; 12 Pages.
Supplemental Chinese Search Report dated Sep. 23, 2020 for related Chinese Appln. No. 201701589276.1; 2 Pages.
Search Report of Chinese Patent Application No. 2017105892761 dated Jul. 27, 2021, 2 pages.
Li et al., "An Original Face Anti-spoofing Approach using Partial Convolutional Neural Network", 2016 Sixth International Conference on Image Processing Theory, Tools and Applications (IPTA), Jan. 19, 2017, 6 pages.

* cited by examiner

NEURAL NETWORK MODEL TRAINING METHOD AND APPARATUS, LIVING BODY DETECTING METHOD AND APPARATUS, DEVICE AND STORAGE MEDIUM

The present application claims the priority of Chinese Patent Application No. 201710589276.1, filed on Jul. 19, 2017, with the title of "Neural network model training method and apparatus, living body detecting method and apparatus, device and storage medium". The disclosure of the above applications is incorporated herein by reference in its entirety.

FIELD OF THE DISCLOSURE

The present disclosure relates to computer application technologies, and particularly to a neural network model training method and apparatus, a living body detecting method and apparatus, a device and a storage medium.

BACKGROUND OF THE DISCLOSURE

As compared with other biological feature recognition technologies, a human face recognition technology has unique advantages in practical application: human face can be directly acquired via a camera, and the recognition procedure may be completed in a non-contacting manner conveniently and quickly.

Currently, human face recognition technology is already applied to many fields such as financing, education, scenic spots, travel and transport and social insurance. However, the human face recognition technology brings about convenience as well as some problems. For example, human face can be easily acquired so that human face can be duplicated by some people in a picture or video manner to achieve the purpose of stealing information. Particularly in the new financing industry, human face recognition technology is already gradually applied to remote account opening, money withdrawal, payment and so on, and involves users' interests.

To this end, a living body detection technology is proposed in the prior art. Plainly speaking, the so-called living body detection means detecting that the face corresponds to a "living person" during human face recognition.

Sources of non-living bodies are wide, and include photos and video displayed on a mobile phone or Pad, and printed photos on different materials (including curving, folding, clipping and hole-digging in various cases), and so on.

The living body detection is applied on important occasions such as social insurance and online account opening. For example, pension cannot be withdrawn unless an elderly user's identity is determined authentic and the elderly user is still alive through verification. Upon online account opening, this can ensure authenticity, validity and safety of the user information.

In a conventional living body detection manner, it is possible to use a camera to collect user pictures, perform feature extraction for user pictures in a predetermined unified manner, and then determine whether the user is a living body according to the extracted features.

However, in the above manner, scenarios are not distinguished, and different scenarios may include different collecting ends, e.g., high, medium and low-end mobile phone cameras. Features to be noticed vary with different scenarios. For example, as for a collecting end with a very good photographing effect, since taken pictures are clearer, texture features may be used to distinguish whether the user is a living body. Regarding a collecting end with an undesirable photographing effect, it is impossible to depend on texture features, and it is necessary to check where there is a rim and there are features such as moire.

Due to the presence of the above problems, the accuracy of the detection result obtained in the conventional living body detection manner is lower.

SUMMARY OF THE DISCLOSURE

In view of the above, the present disclosure provides a neural network model training method and apparatus, a living body detecting method and apparatus, a device and a storage medium, which can improve the accuracy of detection results.

Specific technical solutions are as follows:

A neural network model training method, comprising:

with respect to different scenarios, respectively obtaining picture samples under the scenarios, each picture sample having a tag, the tag including a living body or a non-living body and a corresponding scenario;

according to the obtained picture samples, training to obtain a neural network model whose output is a feature vector which is discriminative for different scenarios, so that when living body detection is performed, a feature vector of a to-be-detected picture is determined according to the neural network model, a picture sample matched with the to-be-detected picture is determined according to the feature vector of the to-be-detected picture, and a tag of the matched picture sample is regarded as a tag of the to-be-detected picture.

According to a preferred embodiment of the present disclosure, the respectively obtaining picture samples under the scenarios comprises:

obtaining positive picture samples and negative picture samples respectively under the scenarios.

A living body detecting method, comprising:

obtaining a to-be-detected picture, and determining a feature vector of the to-be-detected picture according to a neural network model obtained by pre-training, the feature vector being a feature vector which is discriminative for different scenarios;

according to the feature vector of the to-be-detected picture, determining, from pre-obtained picture samples, a picture sample matched with the to-be-detected picture, each picture sample having a tag, the tag including a living body or a non-living body and a corresponding scenario;

regarding the tag of the matched picture sample as a tag of the to-be-detected picture.

According to a preferred embodiment of the present disclosure, before obtaining the to-be-detected picture, the method further comprises:

with respect to different scenarios, obtaining picture samples under the scenario respectively, each picture sample having a tag;

obtaining the neural network model by training according to the obtained picture samples, output of the neural network model being a feature vector discriminative for different scenarios.

According to a preferred embodiment of the present disclosure, the respectively obtaining picture samples under the scenarios comprises:

obtaining positive picture samples and negative picture samples respectively under the scenarios;

the determining, from pre-obtained picture samples, a picture sample matched with the to-be-detected picture comprises:

in a clustering manner, respectively selecting typical positive picture samples and negative picture samples from picture samples under each scenario;

using the selected picture samples to form a sample set, and determining feature vectors of picture samples in the sample set respectively according to the neural network model;

searching in the picture samples in the sample set according to the feature vectors, to determine a picture sample matched with the to-be-detected picture.

According to a preferred embodiment of the present disclosure, the searching in the picture samples in the sample set according to the feature vectors, to determine a picture sample matched with the to-be-detected picture comprises:

respectively calculating distances between the feature vector of the to-be-detected picture and feature vectors of respective picture samples in the sample set;

selecting a picture sample with a minimum distance, and regarding the selected picture sample as a picture sample matched with the to-be-detected picture.

According to a preferred embodiment of the present disclosure, the method further comprises:

when a new scenario appears, obtaining picture samples under the new scenario and adding them into the sample set.

A neural network model training apparatus, comprising: a sample obtaining unit and a model training unit;

the sample obtaining unit is configured to, with respect to different scenarios, respectively obtain picture samples under the scenarios, each picture sample having a tag, the tag including a living body or a non-living body and a corresponding scenario;

the model training unit is configured to, according to the obtained picture samples, train to obtain a neural network model whose output is a feature vector which is discriminative for different scenarios, so that when living body detection is performed, a feature vector of a to-be-detected picture is determined according to the neural network model, a picture sample matched with the to-be-detected picture is determined according to the feature vector of the to-be-detected picture, and a tag of the matched picture sample is regarded as a tag of the to-be-detected picture.

According to a preferred embodiment of the present disclosure, the sample obtaining unit, with respect to different scenarios, obtains positive picture samples and negative picture samples respectively under the scenarios.

A living body detecting apparatus, comprising: an obtaining unit and a detecting unit;

the obtaining unit is configured to obtain a to-be-detected picture, and determine a feature vector of the to-be-detected picture according to a neural network model obtained by pre-training, the feature vector being a feature vector which is discriminative for different scenarios;

the detecting unit is configured to, according to the feature vector of the to-be-detected picture, determine, from pre-obtained picture samples, a picture sample matched with the to-be-detected picture, each picture sample having a tag, the tag including a living body or a non-living body and a corresponding scenario; regard the tag of the matched picture sample as the tag of the to-be-detected picture.

According to a preferred embodiment of the present disclosure, the apparatus further comprises: a first pre-processing unit;

the first pre-processing unit is configured to, with respect to different scenarios, obtain picture samples under the scenario respectively, each picture sample having a tag; obtain the neural network model by training according to the obtained picture samples, output of the neural network model being a feature vector discriminative for different scenarios.

According to a preferred embodiment of the present disclosure, the first pre-processing unit, with respect to different scenarios, obtains positive picture samples and negative picture samples respectively under the scenarios.

The apparatus further comprises: a second pre-processing unit;

the second pre-processing unit is configured to, in a clustering manner, respectively select typical positive picture samples and negative picture samples from picture samples under each scenario; use the selected picture samples to form a sample set, and determine feature vectors of picture samples in the sample set respectively according to the neural network model;

the detecting unit searches in the picture samples in the sample set according to the feature vectors, to determine a picture sample matched with the to-be-detected picture.

According to a preferred embodiment of the present disclosure, the detecting unit respectively calculates distances between the feature vector of the to-be-detected picture and feature vectors of respective picture samples in the sample set; selects a picture sample with a minimum distance, and regards the selected picture sample as a picture sample matched with the to-be-detected picture.

According to a preferred embodiment of the present disclosure, the second pre-processing unit is further configured to, when a new scenario appears, obtain picture samples under the new scenario and add them into the sample set.

A computer device, comprising a memory, a processor and a computer program which is stored on the memory and runnable on the processor, wherein the processor, upon executing the program, implements the above-mentioned neural network model training method.

A computer-readable storage medium on which a computer program is stored, wherein the program, when executed by a processor, implements the above-mentioned neural network model training method.

A computer device, comprising a memory, a processor and a computer program which is stored on the memory and runnable on the processor, wherein the processor, upon executing the program, implements the above-mentioned living body detecting method.

A computer-readable storage medium on which a computer program is stored, wherein the program, when executed by a processor, implements the above-mentioned living body detecting method.

As can be seen from the above introduction, according to the solutions of the present disclosure, it is feasible to, with respect to different scenarios, respectively obtain picture samples under the scenarios, each picture sample having a tag, the tag including a living body or a non-living body and a corresponding scenario; and according to obtained picture samples, train to obtain a neural network model whose output is a feature vector which is discriminative for different scenarios. As such, the living body detection is performed, it is possible to determine the feature vector of the to-be-detected picture according to the neural network model, then determine a picture sample matched with the to-be-detected picture according to the feature vector of the to-be-detected picture, and regard the tag of the matched picture sample as the tag of the to-be-detected picture, thereby obtaining the detection result of the to-be-detected picture. It can be seen that in the above method embodiments, the living body or non-living body is discriminated based on feature vectors discriminative for different scenarios so that the accuracy of the detection result is improved as compared with the prior art. Furthermore, the obtained detection result includes the living body or non-living body as well as corresponding scenario information, thereby enriching the content of the detection result.

DETAILED DESCRIPTION OF PREFERRED EMBODIMENTS

In view of the problems existing in the prior art, the present disclosure provides a neural network model training manner and a living body detecting manner. The living body detection may depend on the neural network model obtained by training.

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
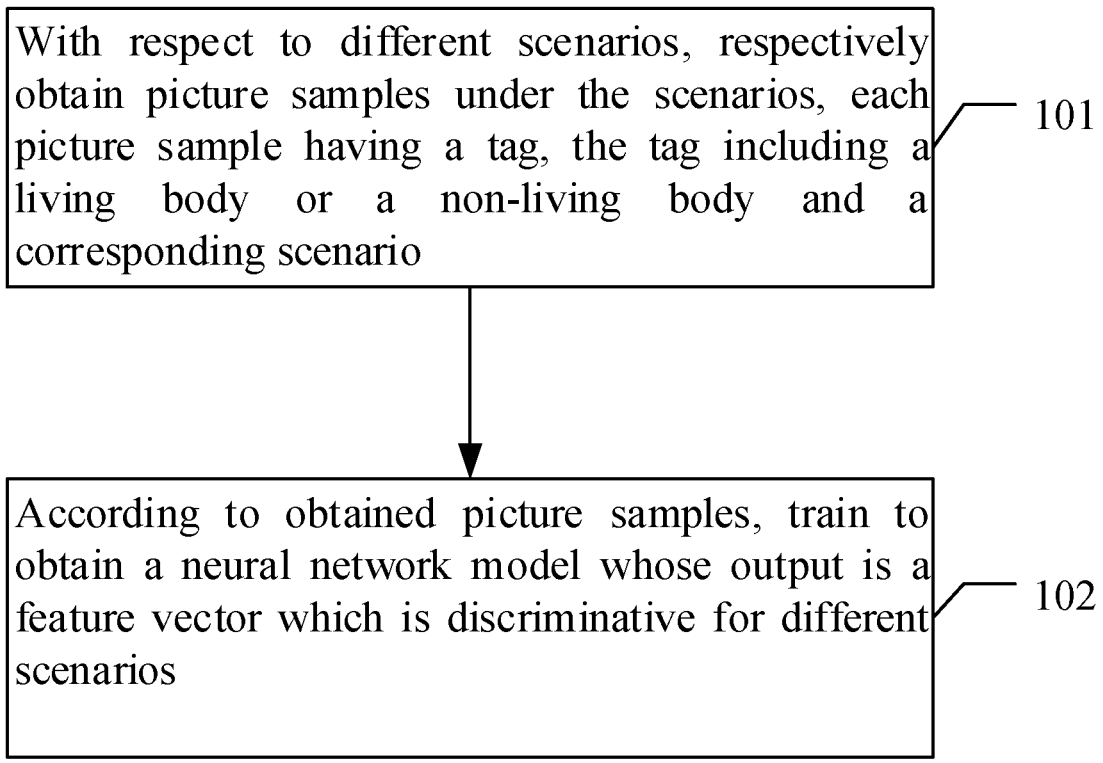
FIG. 1 is a flow chart of an embodiment of a neural network model training method according to the present disclosure.

FIG. 1 is a flow chart of an embodiment of a neural network model training method according to the present disclosure. As shown in FIG. 1, the embodiment comprises the following specific implementation mode.

101 relates to, with respect to different scenarios, respectively obtaining picture samples under the scenarios, each picture sample having a tag, the tag including a living body or a non-living body and a corresponding scenario.

It is necessary to first obtain training samples to train to obtain the neural network model.

Specifically, regarding different scenarios, positive picture samples and negative picture samples are obtained respectively under the scenario. The positive picture samples refer to picture samples of a living body, and negative picture samples refer to picture samples of a non-living body, namely, attack picture samples. For example, if a user uses a mobile phone to take his face picture, the face picture may be regarded as a positive picture sample. If the user uses a mobile phone to take a face picture of another person's picture, the face picture may be regarded as a negative picture sample.

Different scenarios may include different collecting ends such as high, medium and low-end mobile phone cameras, webcam camera and the like. There are different attack manners under different scenarios, for example, attack through a printed picture, attack through a mobile phone picture, attack through mobile phone video, and attack through a clip.

Regarding the obtained picture samples under each scenario, it is further necessary to respectively obtain a tag of the picture sample. The tag may include a living body or a non-living body and corresponding scenario.

In 102, according to the obtained picture samples, train to obtain a neural network model whose output is a feature vector which is discriminative for different scenarios.

After a sufficient number of picture samples are obtained, training is performed according to the obtained picture samples to obtain the neutral network model. Output of the neural network model is a feature vector with a fixed dimensionality, for example, may be a 128-dimensional feature vector.

As stated above, features to be noticed vary with different scenarios. For example, as for a collecting end with a very good photographing effect, since taken pictures are clearer, texture features may be used to distinguish whether the user is a living body. Regarding a collecting end with an undesirable photographing effect, it is impossible to depend on texture features, and it is necessary to check where there is a rim and there are features such as moire.

The neural network model is trained and enabled to learn a kind of feature. This kind of feature can reflect a living body or a non-living body, and needs to be discriminative in scenarios, i.e., discriminative for different scenarios so that different scenarios are farther from one another in feature space, and the same scenarios are closer to one another in the feature space.

Based on the above introduction, how to train to obtain the neural network model is of the prior art.

Subsequently, actual living body detection can be performed based on the neural network model obtained through training.

Figure 2:
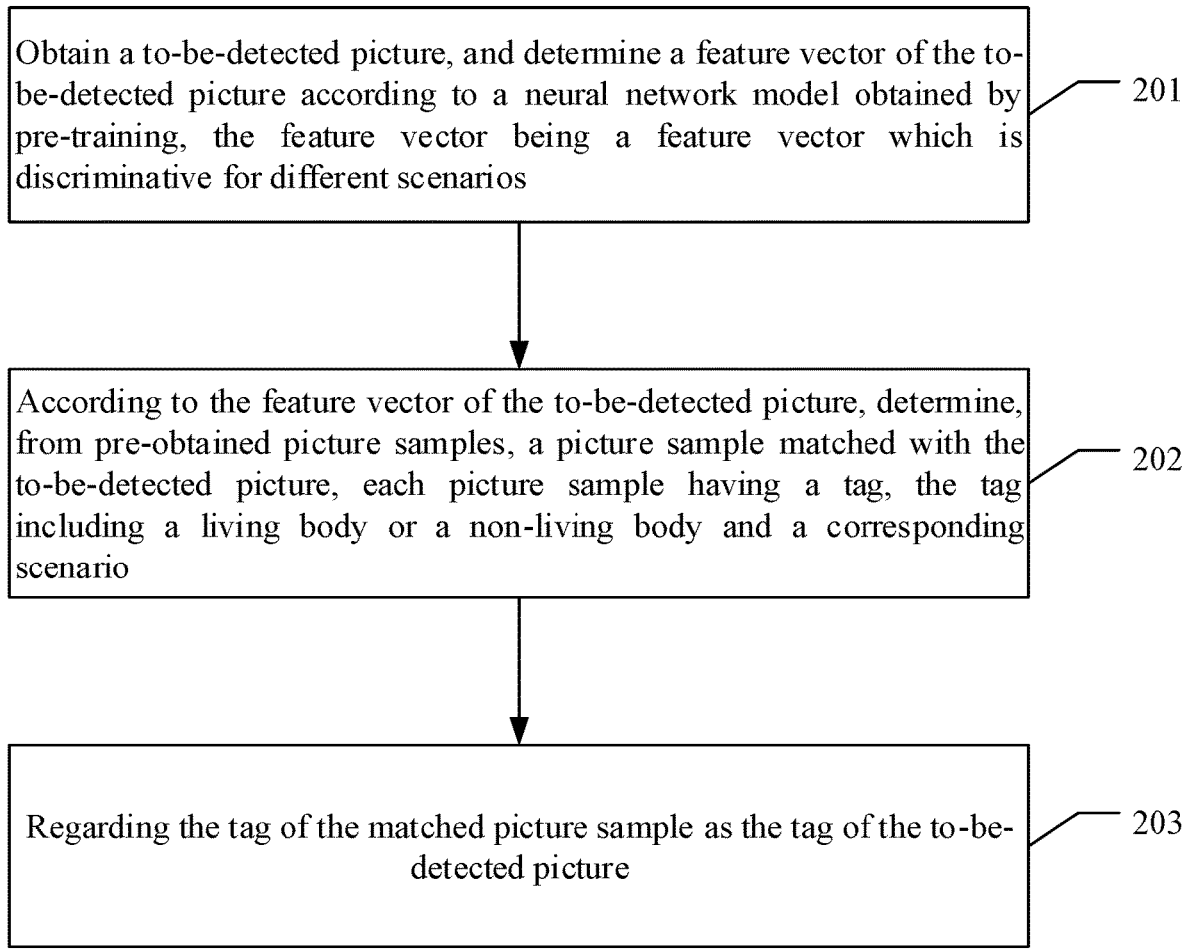
FIG. 2 is a flow chart of a first embodiment of a living body detecting method according to the present disclosure.

FIG. 2 is a flow chart of a first embodiment of a living body detecting method according to the present disclosure. As shown in FIG. 2, the embodiment comprises the following specific implementation mode.

201 relates to obtaining a to-be-detected picture, and determining a feature vector of the to-be-detected picture according to a neural network model obtained by pre-training, the feature vector being a feature vector which is discriminative for different scenarios.

After the neural network model is obtained by training in the manner as shown in FIG. 1, actual living body detection may be performed according to the neural network model.

To this end, after the to-be-detected picture is obtained, it is feasible to first determine the feature vector of the to-be-detected picture according to the neural network model, i.e., input the to-be-detected picture into the neural network model, thereby obtaining the output feature vector.

202 relates to according to the feature vector of the to-be-detected picture, determining, from pre-obtained picture samples, a picture sample matched with the to-be-detected picture, each picture sample having a tag, the tag including a living body or a non-living body and a corresponding scenario.

As stated in FIG. 1, to train to obtain the neural network model, it is necessary to respectively obtain picture samples under different scenarios, and the picture samples include positive picture samples and negative picture samples.

On this basis, it is feasible to, in a clustering manner, select, from picture samples under each scenario, typical positive picture samples and negative picture samples, and use the selected picture samples to form a sample set. The number of picture samples selected under each scenario may depend on actual needs.

For example, it is feasible to, in a clustering manner, determine several class centers, extract picture samples closer to the class centers as typical samples, and use the typical samples to form a sample set.

Regarding each picture sample in the sample set, it is further necessary to determine the feature vector of the picture sample according to the neural network model.

As such, after the feature vector of the to-be-detected picture is obtained, it is feasible to search in the picture samples in the sample set according to the feature vector of the to-be-detected picture, to determine a picture sample matched with the to-be-detected picture.

For example, it is feasible to respectively calculate distances between the feature vector of the to-be-detected picture and feature vectors of respective picture samples in the sample set, then select a picture sample with a minimum distance, and regard the selected picture sample as the picture sample matched with the to-be-detected picture.

How to calculate the distance between feature vectors belongs to the prior art. Assuming that the sample set includes a total of 30 picture samples, it is feasible to respectively calculate distances between the feature vector of the to-be-detected picture and feature vectors of the 30 picture samples to obtain a total of 30 calculation results, then select one with a minimum value from the 30 calculation results, and regard the picture sample corresponding to the selected calculation result as the picture sample matched with the to-be-detected picture.

In 203, a tag of the matched picture sample is regarded as the tag of the to-be-detected picture.

After the matched picture sample is determined, the tag of the matched picture sample may be directly regarded as the tag of the to-be-detected picture. The tag includes a living body or a non-living body and a corresponding scenario, thereby obtaining a detection result of the to-be-detected picture.

Figure 3:
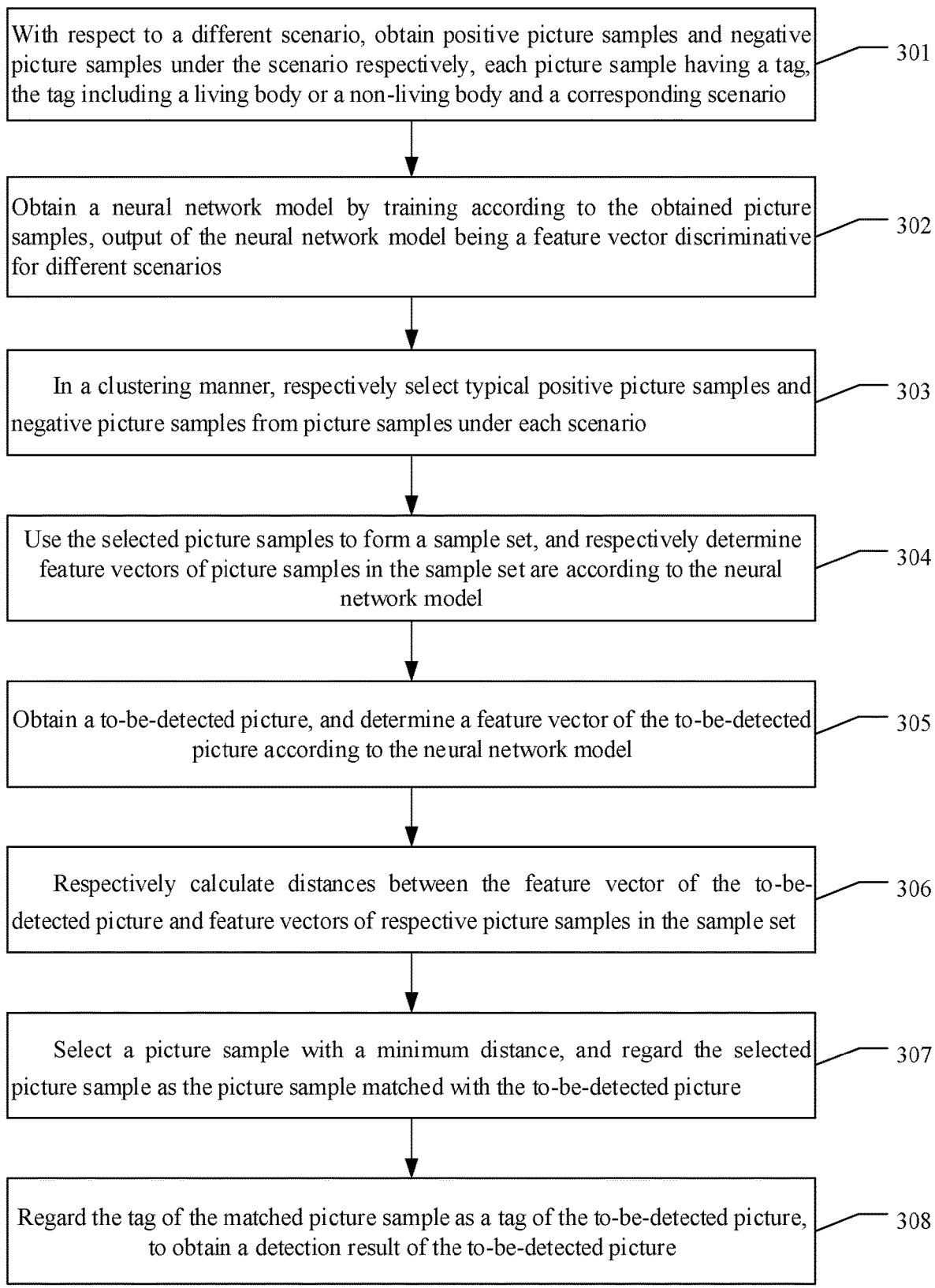
FIG. 3 is a flow chart of a second embodiment of a living body detecting method according to the present disclosure.

On the basis of the above introduction, FIG. 3 is a flow chart of a second embodiment of a living body detecting method according to the present disclosure. As shown in FIG. 3, the embodiment comprises the following specific implementation mode.

In 301, with respect to a different scenario, positive picture samples and negative picture samples under the scenario are respectively obtained, each picture sample having a tag, the tag including a living body or a non-living body and a corresponding scenario.

In 302, a neural network model is obtained by training according to the obtained picture samples, output of the neural network model being a feature vector discriminative for different scenarios.

The neural network model is trained and enabled to learn a kind of feature. This kind of feature can reflect a living body or a non-living body, and needs to be discriminative in scenarios, i.e., discriminative for different scenarios so that different scenarios are farther from one another in feature space, and the same scenarios are closer to one another in the feature space.

In 303, it is possible to, in a clustering manner, respectively select typical positive picture samples and negative picture samples from picture samples under each scenario.

In 304, the selected picture samples are used to form a sample set, and feature vectors of picture samples in the sample set are respectively determined according to the neural network model.

In 305, a to-be-detected picture is obtained, and a feature vector of the to-be-detected picture is determined according to the neural network model.

306 relates to respectively calculating distances between the feature vector of the to-be-detected picture and feature vectors of respective picture samples in the sample set.

307 relates to selecting a picture sample with a minimum distance, and regards the selected picture sample as the picture sample matched with the to-be-detected picture.

308 relates to regarding the tag of the matched picture sample as a tag of the to-be-detected picture, to obtain a detection result of the to-be-detected picture.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

To sum up, according to the solutions of the above method embodiments, it is feasible to, with respect to different scenarios, respectively obtain picture samples under the scenarios, each picture sample having a tag, the tag including a living body or a non-living body and a corresponding scenario; and according to obtained picture samples, train to obtain a neural network model whose output is a feature vector which is discriminative for different scenarios. As such, the living body detection is performed, it is possible to determine the feature vector of the to-be-detected picture according to the neural network model, then determine a picture sample matched with the to-be-detected picture according to the feature vector of the to-be-detected picture, and regard the tag of the matched picture sample as the tag of the to-be-detected picture, thereby obtaining the detection result of the to-be-detected picture. It can be seen that in the above method embodiments, the living body or non-living body is discriminated based on feature vectors discriminative for different scenarios so that the accuracy of the detection result is improved as compared with the prior art. Furthermore, the obtained detection result includes the living body or non-living body as well as information such as the corresponding scenario, thereby enriching the content of the detection result.

In addition, in practical application, a new scenario might appear. To suit the new scenario and prevent appearance of the detection errors, it is possible that when the new scenario appears, picture samples under the new scenario are obtained and added into the sample set, and likewise, it is possible to respectively obtain positive picture samples and negative picture samples under the new scenario.

For example, the original sample set includes a total of 30 picture samples which correspond to four different scenarios, scenario 1 to scenario 4 respectively. Picture samples corresponding to a new scenario 5 may be added into the sample set. Assuming that the expanded sample set includes a total of 36 picture samples, when the living body detection is performed subsequently, it is necessary to respectively calculate distances between the feature vector of the to-be-detected picture and feature vectors of the 36 picture samples, to thereby obtain a total of 36 calculation results, then select one with a minimum value from the 36 calculation results, and regard the tag of the picture sample corresponding to the selected calculation result as the tag of the to-be-detected picture.

Certainly, if necessary, it is also possible to re-train the neural network model in conjunction with the obtained picture samples under the new scenario.

The above introduces the method embodiments. The solution of the present disclosure will be further described through an apparatus embodiment.

Figure 4:
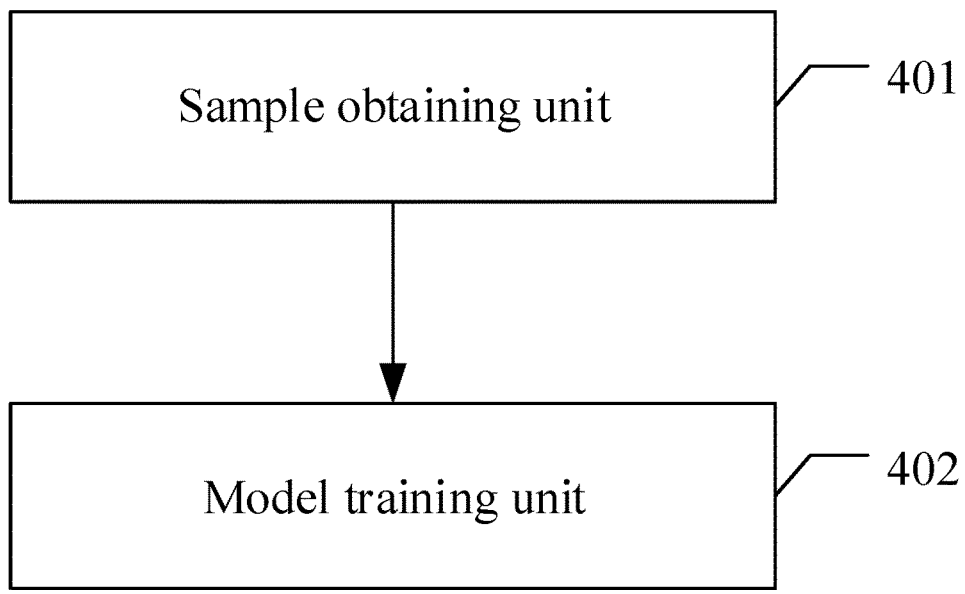
FIG. 4 is a structural schematic diagram of components of an embodiment of a neural network model training apparatus according to the present disclosure.

FIG. 4 is a structural schematic diagram of components of an embodiment of a neural network model training apparatus according to the present disclosure. As shown in FIG. 4, the apparatus comprises a sample obtaining unit 401 and a model training unit 402.

The sample obtaining unit 401 is configured to, with respect to different scenarios, respectively obtain picture samples under the scenarios, each picture sample having a tag, the tag including a living body or a non-living body and a corresponding scenario.

The model training unit 402 is configured to, according to the obtained picture samples, train to obtain a neural network model whose output is a feature vector which is discriminative for different scenarios, so that when living body detection is performed, a feature vector of a to-be-detected picture is determined according to the neural network model, a picture sample matched with the to-be-detected picture is determined according to the feature vector of the to-be-detected picture, and a tag of the matched picture sample is regarded as a tag of the to-be-detected picture.

It is necessary to first obtain training samples to train to obtain the neural network model.

The sample obtaining unit 401 may, with respect to different scenarios, obtain positive picture samples and negative picture samples respectively under the scenario. Regarding each obtained picture sample under each scenario, it is further necessary to respectively obtain a tag of the picture sample. The tag may include a living body or a non-living body and corresponding scenario.

The model training unit 402 may train according to obtained picture samples to obtain the neutral network model. Output of the neural network model is a feature vector with a fixed dimensionality, for example, may be a 128-dimensional feature vector.

Features to be noticed vary with different scenarios. The neural network model is trained and enabled to learn a kind of feature. This kind of feature can reflect a living body or a non-living body, and needs to be discriminative in scenarios, i.e., discriminative for different scenarios so that different scenarios are farther from one another in feature space, and the same scenarios are closer to one another in the feature space.

Figure 5:
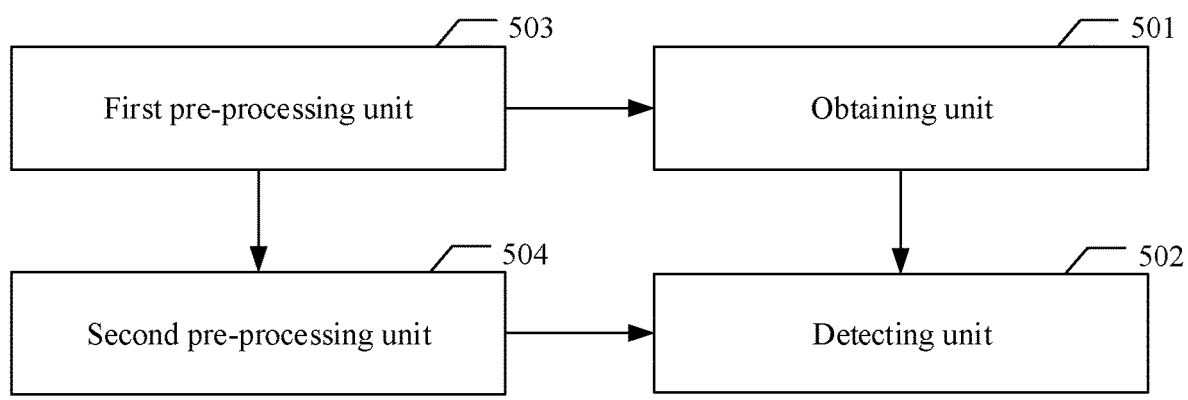
FIG. 5 is a structural schematic diagram of components of a living body detecting apparatus according to the present disclosure.

FIG. 5 is a structural schematic diagram of components of a living body detecting apparatus according to the present disclosure. As shown in FIG. 5, the apparatus comprises an obtaining unit 501 and a detecting unit 502.

The obtaining unit 501 is configured to obtain a to-be-detected picture, and determine a feature vector of the to-be-detected picture according to a neural network model obtained by pre-training, the feature vector being a feature vector which is discriminative for different scenarios.

The detecting unit 502 is configured to, according to the feature vector of the to-be-detected picture, determine, from pre-obtained picture samples, a picture sample matched with the to-be-detected picture, each picture sample having a tag, the tag including a living body or a non-living body and a corresponding scenario; regard the tag of the matched picture sample as the tag of the to-be-detected picture.

As seen from the above, it is necessary to first train to obtain the neural network model to implement the living body detection with respect to the to-be-detected picture. To this end, the apparatus shown in FIG. 5 may further comprise: a first pre-processing unit 503.

The first pre-processing unit 503 is configured to, with respect to different scenarios, obtain picture samples under the scenario respectively, each picture sample having a tag; obtain a neural network model by training according to the obtained picture samples, output of the neural network model being a feature vector discriminative for different scenarios.

The first pre-processing unit 503 corresponds to the apparatus shown in FIG. 4, that is to say, the neural network model training apparatus may exist along as an apparatus, and serve as a component of the living body detecting apparatus, depending on actual needs.

The first pre-processing unit 503 may, with respect to different scenarios, obtain positive picture samples and negative picture samples respectively under the scenario, and then train according to the obtained picture samples to obtain the neural network model.

In addition, the apparatus shown in FIG. 5 may further comprise: a second pre-processing unit 504.

The second pre-processing unit 504 is configured to, in a clustering manner, respectively select typical positive picture samples and negative picture samples from picture samples under each scenario; use the selected picture samples to form a sample set, and determine feature vectors of picture samples in the sample set respectively according to the neural network model.

For example, it is feasible to, in a clustering manner, determine several class centers, extract picture samples closer to the class centers as typical samples, and use the typical samples to form a sample set.

Regarding each picture sample in the sample set, it is further necessary to determine the feature vector of the picture sample according to the neural network model.

As such, after obtaining the feature vector of the to-be-detected picture, the detecting unit 502 may search in the picture samples in the sample set according to the feature vector of the to-be-detected picture, to determine a picture sample matched with the to-be-detected picture.

For example, the detecting unit 502 may respectively calculate distances between the feature vector of the to-be-detected picture and feature vectors of respective picture samples in the sample set, then select a picture sample with a minimum distance, and regard the selected picture sample as a picture sample matched with the to-be-detected picture.

After the matched picture sample is determined, the detecting unit 502 may directly regard the tag of the matched picture sample as the tag of the to-be-detected picture, to obtain a detection result of the to-be-detected picture.

In addition, the second pre-processing unit 504 may be further configured to, when a new scenario appears, obtain picture samples under the new scenario and add them into the sample set.

Reference may be made to corresponding depictions in the aforesaid method embodiments for a specific workflow of the apparatus embodiments shown in FIG. 4 and FIG. 5. The workflow is not detailed any more.

Figure 6:
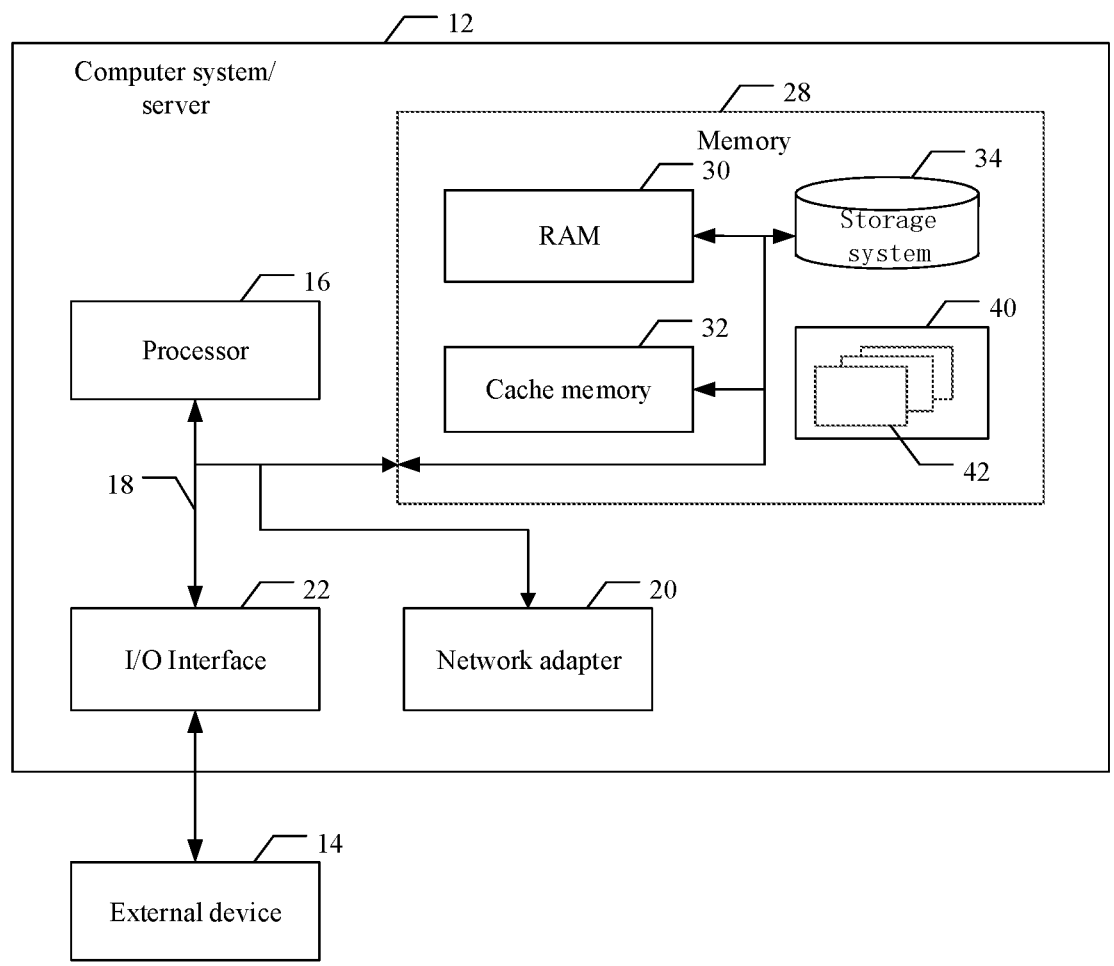
FIG. 6 illustrates a block diagram of an example computer system/server 12 adapted to implement an implementation mode of the present disclosure.

FIG. 6 illustrates a block diagram of an example computer system/server 12 adapted to implement an implementation mode of the present disclosure. The computer system/server 12 shown in FIG. 6 is only an example and should not bring about any limitation to the function and scope of use of the embodiments of the present disclosure.

As shown in FIG. 6, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 6 and typically called a "hard drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 6, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1, 2 or 3, namely, with respect to different scenarios, respectively obtain picture samples under the scenarios, each picture sample having a tag, the tag including a living body or a non-living body and a corresponding scenario; and according to obtained picture samples train to obtain a neural network model whose output is a feature vector which is discriminative for different scenarios. As such, the living body detection is performed, it is possible to determine the feature vector of the to-be-detected picture according to the neural network model, then determine a picture sample matched with the to-be-detected picture according to feature vector of the to-be-detected picture, and regard the tag of the matched picture sample as the tag of the to-be-detected picture.

Reference may be made to related depictions in the above embodiments for specific implementations, which will not be detailed any more.

The present disclosure meanwhile provides a computer-readable storage medium on which a computer program is stored, the program, when executed by a processor, implementing the method stated in the embodiment shown in FIG. 1, 2 or 3.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A neural network model training method, wherein the method comprises:

with respect to different scenarios, respectively obtaining picture samples under the scenarios, each picture sample having a tag, the tag including a living body or a non-living body and a corresponding scenario, wherein a scenario is determined by the level of the photographing effect of a camera for capturing one or more of the picture samples and the level of the photographing effect relates to the clearness of a captured picture sample;

according to the obtained picture samples, training to obtain a neural network model, the output of the neural network model being a feature vector used for distinguishing whether a to-be-detected picture is from a living body or a non-living body in view of said corresponding scenario, wherein the feature vector which is output from the neural network model and associated with the corresponding input training picture sample having different scenarios has a type varying with different scenarios, wherein the feature vector is discriminative for different scenarios so that different scenarios are farther from one another in a feature space, and the same scenarios are closer to one another in the feature space, so that when living body detection is performed, a feature vector of the to-be-detected picture is determined according to the neural network model, a picture sample matched with the to-be-detected picture is determined according to the feature vector of the to-be-detected picture, and a tag of the matched picture sample is regarded as a tag of the to-be-detected picture, wherein the picture samples under different scenarios are captured by different cameras with different levels of photographing effects relating to respective clearness of captured picture samples, and the feature vector which is output from the neural network model and associated with the corresponding input training picture sample having different scenarios has a type varying with different levels of photographing effect, wherein the feature vector relates to a texture feature of the captured picture sample or whether there is a rim or a moire in the captured picture sample as a function of the clearness of the captured picture sample.

2. The method according to claim 1, wherein the respectively obtaining picture samples under the scenarios comprises:

obtaining positive picture samples and negative picture samples respectively under the scenarios.

3. A living body detecting method, wherein the method comprises:

obtaining a to-be-detected picture, and determining a feature vector of the to-be-detected picture according to a neural network model obtained by pre-training, the feature vector which is output from the neural network model being a feature vector used for distinguishing whether the to-be-detected picture is from a living body or a non-living body in view of a corresponding scenario, the feature vector having a type varying with different scenarios, wherein the feature vector is discriminative for different scenarios so that different scenarios are farther from one another in a feature space, and the same scenarios are closer to one another in the feature space;

according to the feature vector of the to-be-detected picture, determining, from pre-obtained picture samples, a picture sample matched with the to-be-detected picture, each picture sample having a tag, the tag including a living body or a non-living body and the corresponding scenario, wherein a scenario is determined by the level of the photographing effect of a camera for capturing one or more of the picture samples and the level of the photographing effect relates to the clearness of a captured picture sample;

regarding the tag of the matched picture sample as the tag of the to-be-detected picture, wherein the picture samples under different scenarios are captured by different cameras with different levels of photographing effects relating to respective clearness of captured picture samples, and the feature vector which is output from the neural network model and associated with the corresponding input training picture sample having different scenarios has a type varying with different levels of photographing effect, wherein the feature vector relates to a texture feature of the captured picture sample or whether there is a rim or a moire in the captured picture sample as a function of the clearness of the captured picture sample.

4. The method according to claim 3, wherein before obtaining the to-be-detected picture, the method further comprises:

with respect to different scenarios, obtaining picture samples under the scenario respectively, each picture sample having a tag;

obtaining the neural network model by training according to the obtained picture samples, the output of the neural network model being a feature vector discriminative for different scenarios.

5. The method according to claim 4, wherein the respectively obtaining picture samples under the scenarios comprises:

obtaining positive picture samples and negative picture samples respectively under the scenarios;

the determining, from pre-obtained picture samples, a picture sample matched with the to-be-detected picture comprises:

in a clustering manner, respectively selecting typical positive picture samples and negative picture samples from picture samples under each scenario;

using the selected picture samples to form a sample set, and determining feature vectors of picture samples in the sample set respectively according to the neural network model;

searching in the picture samples in the sample set according to the feature vectors, to determine a picture sample matched with the to-be-detected picture.

6. The method according to claim 5, wherein the searching in the picture samples in the sample set according to the feature vectors, to determine a picture sample matched with the to-be-detected picture comprises:

respectively calculating distances between the feature vector of the to-be-detected picture and feature vectors of respective picture samples in the sample set;

selecting a picture sample with a minimum distance, and regarding the selected picture sample as a picture sample matched with the to-be-detected picture.

7. The method according to claim 5, wherein the method further comprises:

when a new scenario appears, obtaining picture samples under the new scenario and adding them into the sample set.

8. A computer device, comprising a memory, a processor and a computer program which is stored on the memory and runnable on the processor, wherein the processor, upon executing the program, implements a neural network model training method, wherein the method comprises:

with respect to different scenarios, respectively obtaining picture samples under the scenarios, each picture sample having a tag, the tag including a living body or a non-living body and a corresponding scenario, wherein a scenario is determined by the level of the photographing effect of a camera for capturing one or more of the picture samples and the level of the photographing effect relates to the clearness of a captured picture sample;

according to the obtained picture samples, training to obtain a neural network model, the output of the neural network model being a feature vector used for distinguishing whether a to-be-detected picture is from a living body or a non-living body in view of said corresponding scenario, wherein the feature vector which is output from the neural network model and associated with the corresponding input training picture sample having different scenarios has a type varying with different scenarios, wherein the feature vector is discriminative for different scenarios so that different scenarios are farther from one another in a feature space, and the same scenarios are closer to one another in the feature space, so that when living body detection is performed, a feature vector of the to-be-detected picture is determined according to the neural network model, a picture sample matched with the to-be-detected picture is determined according to the feature vector of the to-be-detected picture, and a tag of the matched picture sample is regarded as a tag of the to-be-detected picture, wherein the picture samples under different scenarios are captured by different cameras with different levels of photographing effects relating to respective clearness of captured picture samples, and the feature vector which is output from the neural network model and associated with the corresponding input training picture sample having different scenarios has a type varying with different levels of photographing effect, wherein the feature vector relates to a texture feature of the captured picture sample or whether there is a rim or a moire in the captured picture sample as a function of the clearness of the captured picture sample.

9. The computer device according to claim 8, wherein the respectively obtaining picture samples under the scenarios comprises:

obtaining positive picture samples and negative picture samples respectively under the scenarios.

10. A computer-readable storage medium on which a computer program is stored, wherein the program, when executed by a processor, implements a neural network model training method, wherein the method comprises:

with respect to different scenarios, respectively obtaining picture samples under the scenarios, each picture sample having a tag, the tag including a living body or a non-living body and a corresponding scenario, wherein a scenario is determined by the level of the photographing effect of a camera for capturing one or more of the picture samples and the level of the photographing effect relates to the clearness of a captured picture sample;

according to the obtained picture samples, training to obtain a neural network model, the output of the neural network model being a feature vector used for distinguishing whether a to-be-detected picture is from a living body or a non-living body in view of said corresponding scenario, wherein the feature vector which is output from the neural network model and associated with the corresponding input training picture sample having different scenarios has a type varying with different scenarios wherein the feature vector is discriminative for different scenarios so that different scenarios are farther from one another in a feature space, and the same scenarios are closer to one another in the feature space, so that when living body detection is performed, a feature vector of the to-be-detected picture is determined according to the neural network model, a picture sample matched with the to-be-detected picture is determined according to the feature vector of the to-be-detected picture, and a tag of the matched picture sample is regarded as a tag of the to-be-detected picture, wherein the picture samples under different scenarios are captured by different cameras with different levels of photographing effects relating to respective clearness of captured picture samples, and the feature vector which is output from the neural network model and associated with the corresponding input training picture sample having different scenarios has a type varying with different levels of photographing effect, wherein the feature vector relates to a texture feature of the captured picture sample or whether there is a rim or a moire in the captured picture sample as a function of the clearness of the captured picture sample.

11. The computer-readable storage medium according to claim 10, wherein the respectively obtaining picture samples under the scenarios comprises:

obtaining positive picture samples and negative picture samples respectively under the scenarios.

12. A computer device, comprising a memory, a processor and a computer program which is stored on the memory and runnable on the processor, wherein the processor, upon executing the program, implements a living body detecting method, wherein the method comprises:

obtaining a to-be-detected picture, and determining a feature vector of the to-be-detected picture according to a neural network model obtained by pre-training, the feature vector which is output from the neural network model being a feature vector used for distinguishing whether the to-be-detected picture is from a living body or a non-living body in view of a corresponding scenario, the feature vector having a type varying with different scenarios, wherein the feature vector is discriminative for different scenarios so that different scenarios are farther from one another in a feature space, and the same scenarios are closer to one another in the feature space;

according to the feature vector of the to-be-detected picture, determining, from pre-obtained picture samples, a picture sample matched with the to-be-detected picture, each picture sample having a tag, the tag including a living body or a non-living body and the corresponding scenario, wherein a scenario is determined by the level of the photographing effect of a camera for capturing one or more of the picture samples and the level of the photographing effect relates to the clearness of a captured picture sample;

regarding the tag of the matched picture sample as the tag of the to-be-detected picture, wherein the different scenarios comprise different cameras with different levels photographing effects relating to respective clearness of captured picture samples, and the feature vector which is output from the neural network model and associated with the corresponding input training picture sample having different scenarios has a type varying with different levels of photographing effect, wherein the feature vector relates to a texture feature of the captured picture sample or whether there is a rim or a moire in the captured picture sample as a function of the clearness of the captured picture sample.

13. The computer device according to claim 12, wherein before obtaining the to-be-detected picture, the method further comprises:

with respect to different scenarios, obtaining picture samples under the scenario respectively, each picture sample having a tag;

obtaining the neural network model by training according to the obtained picture samples, the output of the neural network model being a feature vector discriminative for different scenarios.

14. The computer device according to claim 13, wherein the respectively obtaining picture samples under the scenarios comprises:

obtaining positive picture samples and negative picture samples respectively under the scenarios;

the determining, from pre-obtained picture samples, a picture sample matched with the to-be-detected picture comprises:

in a clustering manner, respectively selecting typical positive picture samples and negative picture samples from picture samples under each scenario;

using the selected picture samples to form a sample set, and determining feature vectors of picture samples in the sample set respectively according to the neural network model;

searching in the picture samples in the sample set according to the feature vectors, to determine a picture sample matched with the to-be-detected picture.

15. The computer device according to claim 14, wherein the searching in the picture samples in the sample set according to the feature vectors, to determine a picture sample matched with the to-be-detected picture comprises:

respectively calculating distances between the feature vector of the to-be-detected picture and feature vectors of respective picture samples in the sample set;

selecting a picture sample with a minimum distance, and regarding the selected picture sample as a picture sample matched with the to-be-detected picture.

16. The computer device according to claim 14, wherein the method further comprises:

when a new scenario appears, obtaining picture samples under the new scenario and adding them into the sample set.

17. A computer-readable storage medium on which a computer program is stored, wherein the program, when executed by a processor, implements a living body detecting method, wherein the method comprises:

obtaining a to-be-detected picture, and determining a feature vector of the to-be-detected picture according to a neural network model obtained by pre-training, the feature vector which is output from the neural network model being a feature vector used for distinguishing whether the to-be-detected picture is from a living body or a non-living body in view of a corresponding scenario, the feature vector having a type varying with different scenarios, wherein the feature vector is discriminative for different scenarios so that different scenarios are farther from one another in a feature space, and the same scenarios are closer to one another in the feature space;

according to the feature vector of the to-be-detected picture, determining, from pre-obtained picture samples, a picture sample matched with the to-be-detected picture, each picture sample having a tag, the tag including a living body or a non-living body and the corresponding scenario, wherein a scenario is determined by the level of the photographing effect of a camera for capturing one or more of the picture samples and the level of the photographing effect relates to the clearness of a captured picture sample;

regarding the tag of the matched picture sample as the tag of the to-be-detected picture, wherein the different scenarios comprise different cameras with different levels photographing effects relating to respective clearness of captured picture samples, and the feature vector which is output from the neural network model and associated with the corresponding input training picture sample having different scenarios has a type varying with different levels of photographing effect, wherein the feature vector relates to a texture feature of the captured picture sample or whether there is a rim or a moire in the captured picture sample as a function of the clearness of the captured picture sample.

18. The computer-readable storage medium according to claim 17, wherein before obtaining the to-be-detected picture, the method further comprises:

with respect to different scenarios, obtaining picture samples under the scenario respectively, each picture sample having a tag;

obtaining the neural network model by training according to the obtained picture samples, the output of the neural network model being a feature vector discriminative for different scenarios.

19. The computer-readable storage medium according to claim 18, wherein the respectively obtaining picture samples under the scenarios comprises:

obtaining positive picture samples and negative picture samples respectively under the scenarios;

the determining, from pre-obtained picture samples, a picture sample matched with the to-be-detected picture comprises:

in a clustering manner, respectively selecting typical positive picture samples and negative picture samples from picture samples under each scenario;

using the selected picture samples to form a sample set, and determining feature vectors of picture samples in the sample set respectively according to the neural network model;

searching in the picture samples in the sample set according to the feature vectors, to determine a picture sample matched with the to-be-detected picture.

20. The computer-readable storage medium according to claim 19, wherein the searching in the picture samples in the sample set according to the feature vectors, to determine a picture sample matched with the to-be-detected picture comprises:

respectively calculating distances between the feature vector of the to-be-detected picture and feature vectors of respective picture samples in the sample set;

selecting a picture sample with a minimum distance, and regarding the selected picture sample as a picture sample matched with the to-be-detected picture.

* * * * *